(12) United States Patent
Kumar et al.

(10) Patent No.: US 7,614,469 B2
(45) Date of Patent: Nov. 10, 2009

(54) BATTERY CASE AND METHOD FOR SECURING SAME

(75) Inventors: Ajith Kuttannair Kumar, Erie, PA (US); Michael Patrick Marley, Erie, PA (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 11/745,136

(22) Filed: May 7, 2007

(65) Prior Publication Data

US 2008/0280195 A1 Nov. 13, 2008

(51) Int. Cl.
*B60R 16/04* (2006.01)
(52) U.S. Cl. .................................. 180/68.5; 429/100
(58) Field of Classification Search ................ 429/99, 429/100, 149; 180/68.5; 220/920
See application file for complete search history.

(56) References Cited

U.S. PATENT DOCUMENTS

| | | | |
|---|---|---|---|
| 1,438,130 A | 12/1922 | Miller | |
| 3,557,895 A | 1/1971 | Thomas | |
| 3,575,250 A | 4/1971 | Dykes | |
| 3,667,563 A | 6/1972 | Korb et al. | |
| 3,821,997 A | 7/1974 | Sieren | |
| 3,834,479 A | 9/1974 | Bowers et al. | |
| 3,838,745 A | 10/1974 | Kappei | |
| 3,866,704 A | 2/1975 | Bowers et al. | |
| 3,903,981 A | 9/1975 | Peterson | |
| 4,013,136 A | 3/1977 | Fear | |
| 4,077,485 A | 3/1978 | Bonora et al. | |
| 4,252,206 A | 2/1981 | Burkholder et al. | |
| 4,365,681 A | 12/1982 | Singh | |
| 4,407,911 A | 10/1983 | Hooke | |
| 4,435,486 A | 3/1984 | Pomaro et al. | |
| 4,515,233 A | 5/1985 | Silverstein | |
| 4,520,887 A | 6/1985 | DiFazio | |
| 4,565,256 A * | 1/1986 | Valdez | 180/68.5 |
| 4,723,618 A | 2/1988 | Coonradt | |
| 4,754,827 A * | 7/1988 | Hirabayashi | 180/68.5 |
| 4,756,978 A | 7/1988 | Nitcher et al. | |
| 4,779,692 A | 10/1988 | Hagarty et al. | |
| 4,854,540 A | 8/1989 | Balek | |
| 4,966,346 A | 10/1990 | Karna et al. | |
| 5,086,860 A | 2/1992 | Francis | |
| 5,132,194 A | 7/1992 | Williams | |
| 5,140,744 A | 8/1992 | Miller | |
| 5,187,031 A | 2/1993 | Heiman | |
| 5,377,947 A | 1/1995 | Johnson | |
| 5,392,873 A | 2/1995 | Masuyama et al. | |

(Continued)

FOREIGN PATENT DOCUMENTS

WO    WO 2007/047809 A    4/2007

*Primary Examiner*—Melvin C Mayes
*Assistant Examiner*—James Corno
(74) *Attorney, Agent, or Firm*—GE Global Patent Operation (57) ABSTRACT

Battery enclosures include a pre-stressed bottom sheet having a convex surface, at least one vibration isolator disposed along at least a portion of a perimeter of the bottom sheet, a sidewall in contact with the at least one vibration isolator so as to be isolated from the bottom sheet, and at least one strap attached to the bottom sheet, the at least one strap being configured to hold a bottom surface of an outer casing of a battery against the convex surface of the bottom sheet such that internal battery cells are supported by a substantially planar surface.

21 Claims, 9 Drawing Sheets

U.S. PATENT DOCUMENTS

| | | |
|---|---|---|
| 5,421,427 A | 6/1995 | Ogawa et al. |
| 5,547,160 A | 8/1996 | Johnson |
| 5,555,950 A | 9/1996 | Harada et al. |
| 5,633,095 A | 5/1997 | Ishikawa et al. |
| 5,789,898 A | 8/1998 | Suzuki et al. |
| 5,824,432 A | 10/1998 | Currle |
| 6,085,854 A | 7/2000 | Nishikawa |
| 6,153,331 A | 11/2000 | Brantley et al. |
| 6,161,810 A | 12/2000 | Crow et al. |
| 6,190,795 B1 | 2/2001 | Daley |
| 6,230,834 B1 | 5/2001 | Van Hout et al. |
| 6,255,015 B1 | 7/2001 | Corrigan et al. |
| 6,291,095 B1 | 9/2001 | Griffey et al. |
| 6,431,300 B1 | 8/2002 | Iwase |
| 6,547,020 B2 | 4/2003 | Maus et al. |
| 6,564,893 B2 | 5/2003 | Lipman |
| 6,572,999 B1 | 6/2003 | Stocchiero |
| 6,632,560 B1 | 10/2003 | Zhou et al. |
| 6,645,664 B2 | 11/2003 | Nakanishi et al. |
| 6,648,090 B2 | 11/2003 | Iwase |
| 6,668,957 B2 | 12/2003 | King |
| 6,871,829 B2 | 3/2005 | Shannon, Jr. |
| 7,014,002 B2 | 3/2006 | Mizuta |
| 7,070,015 B2 | 7/2006 | Mathews et al. |
| 7,117,966 B2 | 10/2006 | Kohda et al. |
| 7,140,458 B2 | 11/2006 | Nakagawa et al. |
| 2008/0063934 A1 | 3/2008 | Bechtold |

* cited by examiner

FIG. 10

BATTERY CASE AND METHOD FOR SECURING SAME

BACKGROUND OF THE INVENTION

Field of the Invention

Embodiments described herein relate generally to batteries and more particularly to improved battery cases and methods for securing the same in electric and hybrid vehicles.

In electric vehicles and in hybrid electric vehicles and non-vehicle applications (e.g., locomotives, off-highway mining vehicles, marine applications, buses and automobiles, and cranes, to name a few), batteries are essential components used to store a portion of the energy that is regenerated during braking for later use during motoring and/or generated for later use when the demand is low, thus increasing fuel efficiency.

Figure 1:
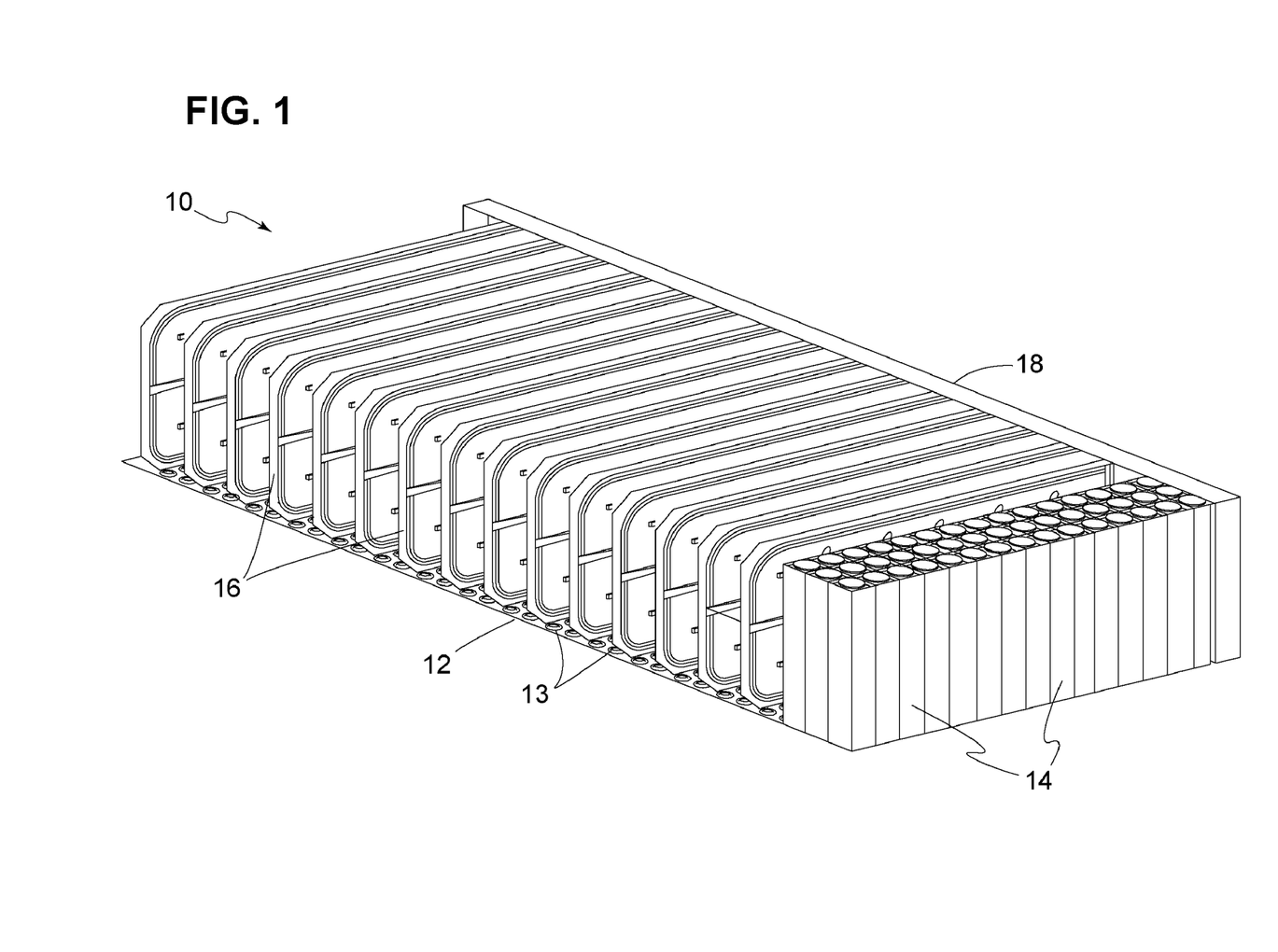
FIG. 1 illustrates a perspective view of an inner assembly of a conventional battery.
Figure 2:
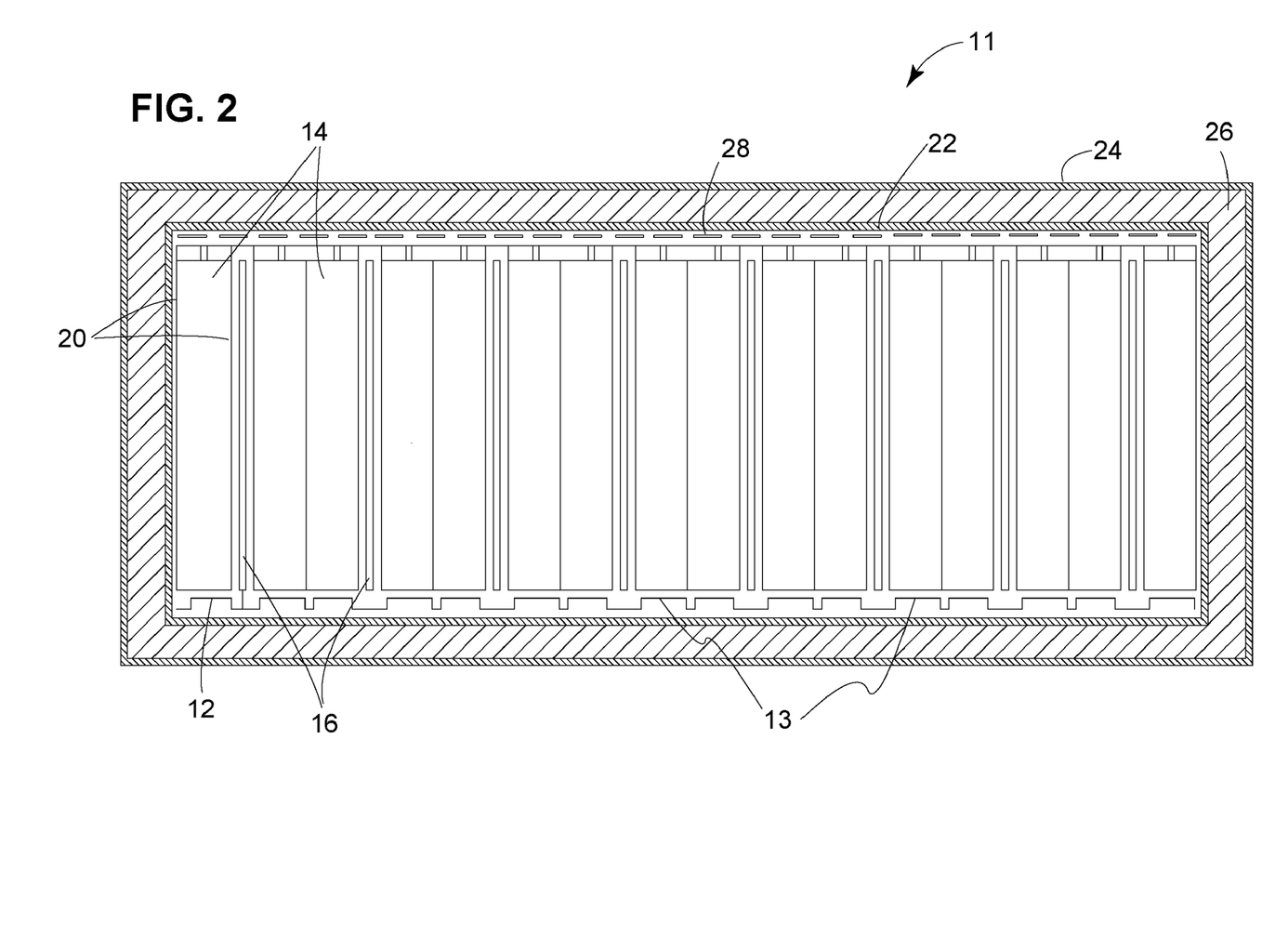
FIG. 2 illustrates a cross-sectional view of a conventional battery having the inner assembly of FIG. 1.

FIG. 1 illustrates an inner assembly 10 of a conventional battery 11 and FIG. 2 shows a cross-sectional view of the conventional battery 11 having the inner assembly 10 of FIG. 1. As illustrated, the inner assembly 10 of the conventional battery 11 includes a base plate 12, also known as a button sheet, having a plurality of buttons or protrusions 13 configured to support a plurality of cells 14 electrically connected to each other by a plurality of bus bars (not shown). Separating groups of cells 14, a plurality of cooling ducts or plates 16 supplied with air from a cooling header 18 is designed to maintain the cells 14 within a desired operating temperature range. As it will be apparent to one of ordinary skill, FIG. 1 is presented herein only for the purpose of illustrating components of the conventional battery 11, including only a small number of cells 14 for better clarity of the other features illustrated and described, and should not be considered as limiting the different embodiments disclosed in any way or as an illustration of a commercial product. For example, in some conventional batteries, different than what is illustrated in FIG. 1, a cooling plate 16 is provided between each row of cells 14.

As illustrated in FIG. 2, mica sheets 20 are packed between adjacent cells 14 so as to insulate the cells 14 from each other and from the mechanical packaging of the conventional battery 11. The mechanical packaging of the conventional battery 11 also includes an inner casing 22, which envelops the inner assembly 10, separated from an outer casing 24 by a layer of insulation material 26. Typically, the space between the inner casing 22 and the outer casing 24 is evacuated in order to minimize heat transfer to and/or from the battery 11. A heater 28 is provided to raise the temperature of the battery to a desired operating level.

As understood by those of ordinary skill, many different types of batteries are known to exist and the embodiments disclosed herein are not limited to a particular battery type; however, current high-temperature batteries, such as Sodium Nickel Chloride batteries, are prone to failures due to the flexible nature of several of the components and lack of structural and/or mechanical integrity, thus leading to premature damage caused by static loads and/or dynamic mechanical vibrations generated, for example, by operation of a vehicle carrying the battery 11. For example, the vacuum applied between the inner casing 22 and outer casing 24 tends to bow these components toward each in view of the complaint nature of the insulation material 26, thereby forming a non-uniform surface to support the cells 14 and causing the battery to rest against a supporting surface only at the edges of the outer casing 24. However, given the tensile strength of a typical bus bar, only a small cell-to-cell deflection is needed to break the electrical connection between cells. This problem is further exacerbated by dynamic loads, where mechanical vibrations cause relative motion of the mica sheets 20 and the cells 14 with respect to each other, leading to loss in electrical connection between cells due to bus bar failures, electrical creep, and/or strike failures due to tight spaces, and damage of the mechanical and insulating property of the mica sheets.

Other known technological challenges of conventional batteries include, but are not limited to: creep and strike failures due to electrical isolation material separation; high energy, low frequency cell resonance due to flexible base; large cell translations due to resonant cell response; mechanical failure of joint between base plate and cooling duct, internal cell damage (hot cells), bus bar fractures, internal battery case damage, and heater sheet cracking and punctures due to large cell translation; vacuum loss due internal battery case damage; loss of heater continuity due to heater sheet cracking and punctures; loss of ability to maintain proper battery temperature due to loss of heater continuity, loss of cell conductivity (and/or proper operation); damage to inter-cell separator seal due to internal cell damage; and leaking of liquid sodium due to inter-cell separator seal damage. In addition, these batteries are heavy and may operate at voltages above 10,000 V, thus requiring specialized handling equipment during installation and maintenance while, at the same time, exposing operators to the risk of high-voltage when connecting and disconnecting conventional batteries in the above-noted applications.

It would therefore be desirable to develop a battery case with improved mechanical strength and integrity to properly house and isolate a battery from static and dynamic loads so as to extend the lifetime of batteries used in high-vibration environments of electric and/or hybrid transportation vehicles, including locomotives.

BRIEF SUMMARY OF THE INVENTION

One or more of the above-summarized needs or others known in the art are addressed by battery enclosures that include a pre-stressed bottom sheet having a convex surface, at least one vibration isolator disposed along at least a portion of a perimeter of the bottom sheet, a sidewall in contact with the at least one vibration isolator so as to be isolated from the bottom sheet, and at least one strap attached to the bottom sheet, the at least one strap being configured to hold a bottom surface of an outer casing of a battery against the convex surface of the bottom sheet.

In another aspect of the subject matter disclosed, enclosure/battery combinations include a battery with a plurality of cells, a button sheet supporting the cells, and an outer casing; and a battery enclosure including a pre-stressed bottom sheet with a convex top surface, vibration isolators disposed on corresponding corners of the bottom sheet, sidewalls isolated from the bottom sheet by the vibration isolators, straps attached to the bottom sheet, a plurality of composite sheets disposed between the straps and the battery, and an L-shaped cover forming a portion of the sidewalls, an outer surface of the outer casing of the battery being compressed against the convex surface of the bottom sheet by the straps such that the plurality of cells of the battery is maintained substantially flat.

Vehicles that include the above-noted combinations are also within the scope of the disclosed innovations, these vehicles including rack-mounting brackets having grooves mating with corresponding protrusion disposed on the battery enclosure. The rack-mounting brackets include a first horizontally extending frame member having a first portion connected to a structural member of the vehicle, a second frame member having a first end portion connected to the first frame member at a second end portion thereof disposed away from the structural member and a second end portion, extending diagonally, connected to the structural member, and a third frame member connected to the second end portion of the first member extending generally downward therefrom.

Methods for securing a battery to a battery enclosure are also within the embodiments disclosed, these methods including steps of covering at least a portion of the battery with a composite sheet, disposing a strap over the composite sheet, attaching end portions of the strap to a bottom sheet of the battery enclosure, and compressing a bottom surface of the battery to a pre-stressed convex surface of the bottom sheet of the battery enclosure so that internal cells of the battery are maintained substantially flat.

The above brief description sets forth features of the disclosed embodiments in order that the detailed description that follows may be better understood, and in order that the present contributions to the art may be better appreciated. There are, of course, other features that will be described hereinafter, which features will also be for the subject matter of the appended claims.

In this respect, before explaining several of the disclosed embodiments in detail, it is understood that the disclosed embodiments are not limited in their application to the details of the construction and to the arrangements of the components set forth in the following description or illustrated in the drawings. The subject matter disclosed is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the disclosed embodiments. It is important, therefore, that the claims be regarded as including such equivalent constructions insofar as they do not depart from the spirit and scope of the subject matter disclosed.

Further, the purpose of the foregoing Abstract is to enable a patent examiner and/or the public generally, and especially scientists, engineers and practitioners in the art who are not familiar with patent or legal terms or phraseology, to determine quickly from a cursory inspection the nature and essence of the technical disclosure of the application. Accordingly, the Abstract is neither intended to define the disclosed embodiments or the application, which only is measured by the claims, nor is it intended to be limiting as to the scope of the invention in any way.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein:

FIG. 8 illustrates side (FIG. 8A) and front (FIG. 8B) views of a rack-mounting bracket and a front view (FIG. 8C) of a battery supported by two rack-mounting brackets.

DETAILED DESCRIPTION OF THE PREFERRED EMBODIMENTS

The subject matters disclosed and described herein relate generally to batteries and more particularly to improved battery cases and methods for securing a battery in electric and hybrid vehicles. Such battery cases, possessing improved structural and mechanical integrity, facilitate the extension of battery lifetimes by preventing or minimizing premature battery damage caused by static and dynamic loads from the electric or hybrid vehicle in which the battery is installed. In addition, these improved battery enclosures also provide for easy insertion and removal from the vehicle by use of improved rack-mounting brackets. Referring now to the drawings, wherein like reference numerals designate identical or corresponding parts throughout the several views, several of the disclosed embodiments will be described.

Figure 3:
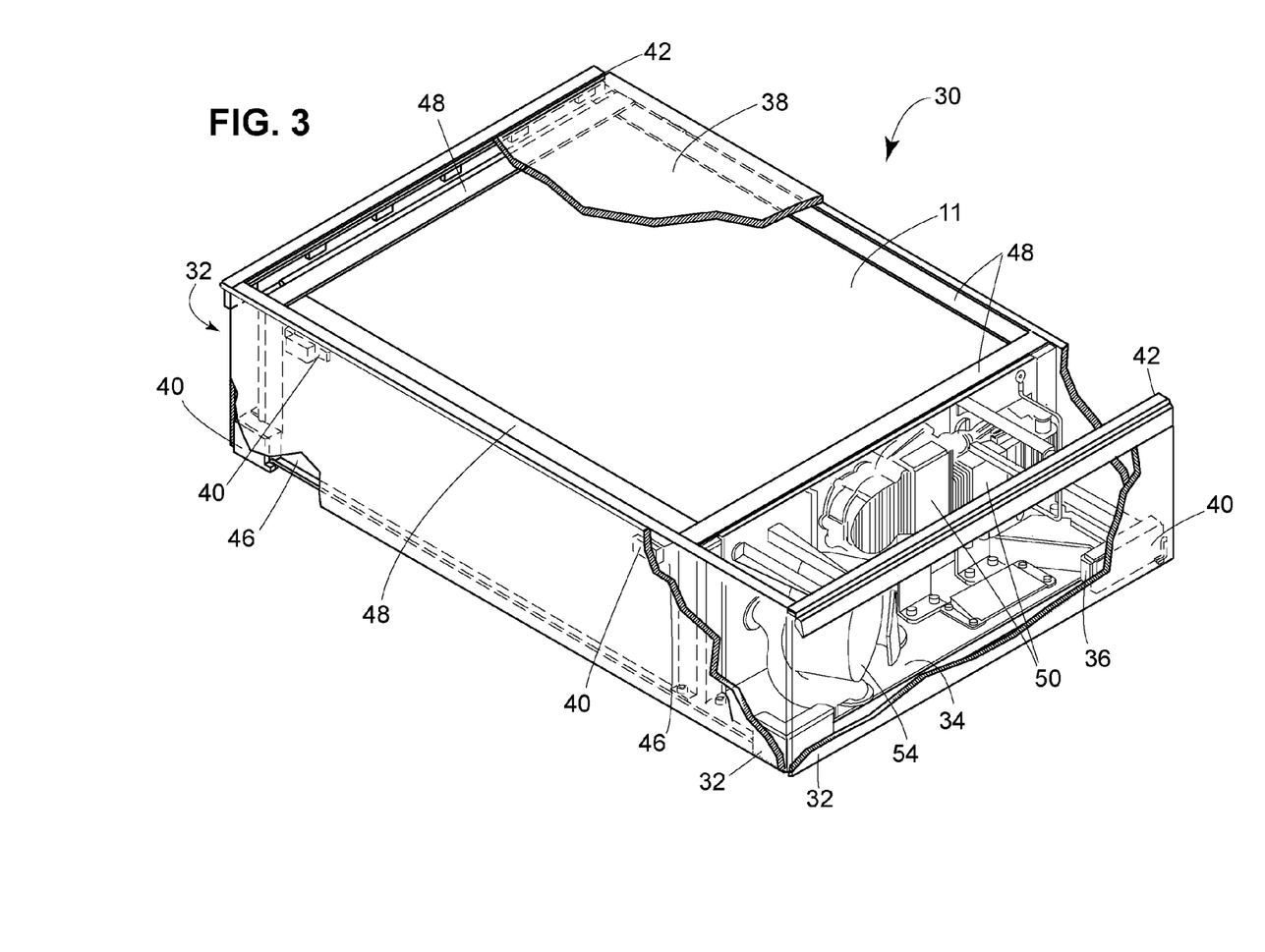
FIG. 3 illustrates a perspective rear view of an embodiment of a battery case containing a battery.
Figure 4:
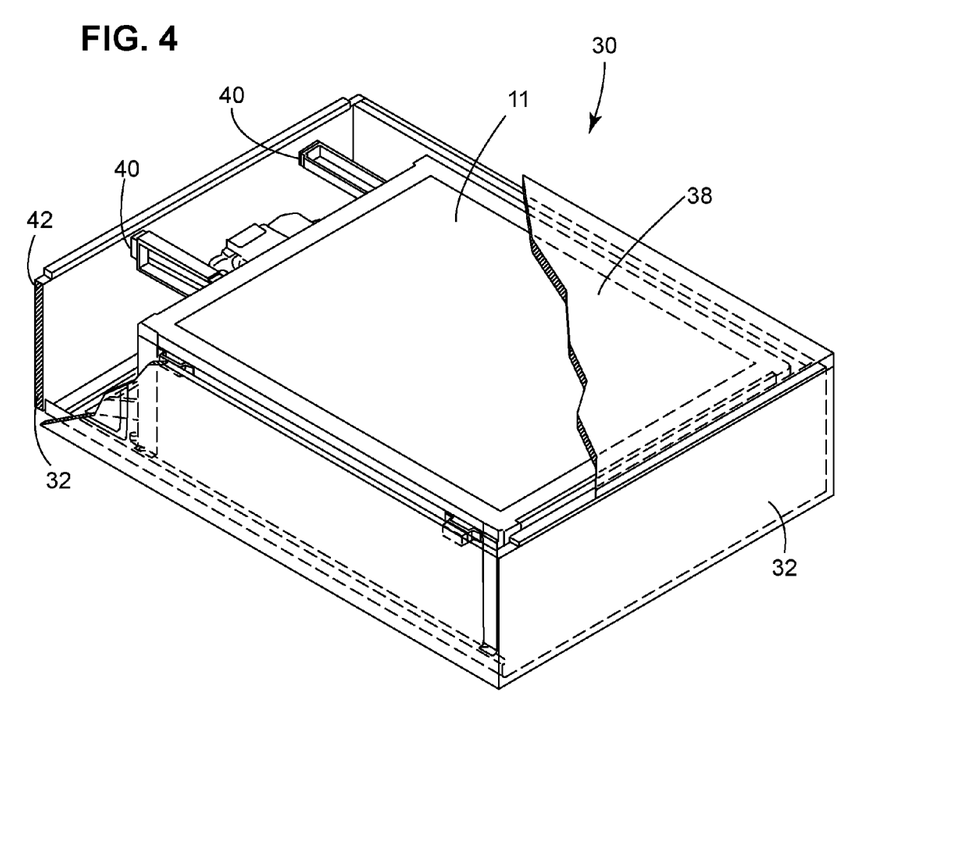
FIG. 4 illustrates a perspective front view of the battery case of FIG. 3.

FIGS. 3 and 4 illustrate perspective rear and front views of a battery case 30 according to an embodiment of the subject matter disclosed. In the illustration provided in these two figures, the battery 11 is disposed inside of the battery case 30 so as to better illustrate the structural relationships of the various parts. The battery case 30 includes sidewalls 32, a bottom sheet 34 constructed of a sheet metal over struts 36, a cover 38, various vibration isolators 40, and various brackets. The bottom sheet 34 may be lightweight while the struts 36 may be pre-stressed in any desired pattern, e.g., an X-pattern, including no pattern (e.g., a plane convex sheet) below the bottom sheet 34 to make the lightweight sheet rigid and to impart a convex shape to a top surface of the bottom sheet 34. As used herein throughout, the expression "bottom sheet" is used broadly to encompass other structures configured to accommodate the bottom portion of a battery outer casing, as explained. For example, the bottom sheet 34 may comprise perforated members, or a perforated sheet, a collection of structural members so as to form a convex surface to support the bottom surface of an outer casing of a battery, etc. The corners of the bottom sheet 34 (not shown) may also be raised to allow space for the vibration isolators 40 disposed along the corners of the battery case 30 so as to isolate the sidewalls 32 from the bottom sheet 34. The pre-stressed bottom sheet 34 provides a rigid surface for the battery 11 to rest on so as to reduce flexing of the internal battery components. The convex shape of the upper surface of the bottom sheet 34 is such that it eliminates or minimizes the deflection of the cells 14 caused by the sagging of the inner casing 22 toward the outer casing 24 due to the vacuum applied between these two casings, as previously described.

The sidewalls 32 do not directly contact the bottom sheet 34, but are shaped so as to form an angle at the bottom to engage the bottom sheet 34 through the vibration isolators 40.

The vibration isolators 40 may be disposed along the perimeter of the battery case 30 or simply around the four corners. In addition, in one embodiment, the two sidewalls 32 may be connected across the front with a piece of angle metal (not shown), e.g., iron, supported across lengthwise by the enclosure cover 38. The enclosure cover 38 may also be an L-shaped piece of metal with one leg forming the top of the battery enclosure 30 and the other leg forming the front of the battery enclosure 30. The edges of the top portion of the L-shaped enclosure cover 38 slide into recessed grooves 42 formed along the top of the sidewalls 32. In addition, the top portion of the L-shaped enclosure cover 38 may be stamped with a shallow groove (e.g., an X-shaped groove) to provide additional stiffness. The front of the L-shaped enclosure cover 38 wraps around and is fastened to the angle metal at the bottom of the battery enclosure 30 to provide vertical stiffness to the angle metal.

Additional vibration isolators 40 may also be disposed between the vertical sidewalls 32 and the battery 11 on brackets 44 attached to thin composite sheets 46, e.g. thin sheets of a fiberglass material. These composite sheets 46 allow the perimeter of the battery 11 to be drawn down and fastened to the bottom sheet 34 with straps 48 in tension without damaging the battery 11. As used herein throughout, the expression "strap" is used broadly and includes any other devices to hold the battery 30 down. These include, but are not limited to, a sheet, a frame member, a channel member, attached to the bottom sheet 34 by any known means, including bolts and rods, to name just a few. Various brackets 50 may be provided to support battery controls 52, such as a battery module interface, and/or to mount other components of the battery 11, such as a cooling fan 54, and provisions may be made through the bottom sheet 34 and/or vertical walls 32 to accommodate conduit termination for wiring and hot air exhaust from the battery cooling system. The additional vibration isolators 40 provide vibration isolation in the lateral direction as well as support to the upper portion of the battery 11 by virtue of its own mass and may be attached to a piece of a composite material and fastened to the composite sheets 46. Also, the straps 48 may be fastened to the bottom sheet 34 at the bottom in order to hold the battery 11 and the composite sheets 46 down. The material of the composite sheets 46 may be selected based on its thermal properties in order to minimize heat transfer to and from the battery 11 since the same may be operated at elevated temperature relative to the temperature of the environment. In addition, washers (not shown) having a surface area similar to that of the straps 48 may be used to tie the straps 48 down so as not to distort the straps 48 when attaching them. The several attachments to the bottom sheet 34 may be accomplished by use of threaded nuts attached to the bottom sheet 34.

As understood by those of ordinary skill in the applicable arts, the vibration insulator 40 may only be disposed at the corners of the battery enclosure 30 and be selected such as to attenuate particular frequencies produced by the vehicle carrying the battery 11. When disposed at the corners of the battery enclosure 30, the vibration insulators 40 provide isolation in all three directions. In one embodiment, the vibration insulators 40 are elastomeric materials, whose relevant physical properties, such as, but not limited to spring rate and dynamic response, are selected taking into consideration the dynamic response of the battery enclosure 30, of the battery 11 inserted therein, as well as of the vehicle carrying the enclosure/battery combination.

Figure 5:
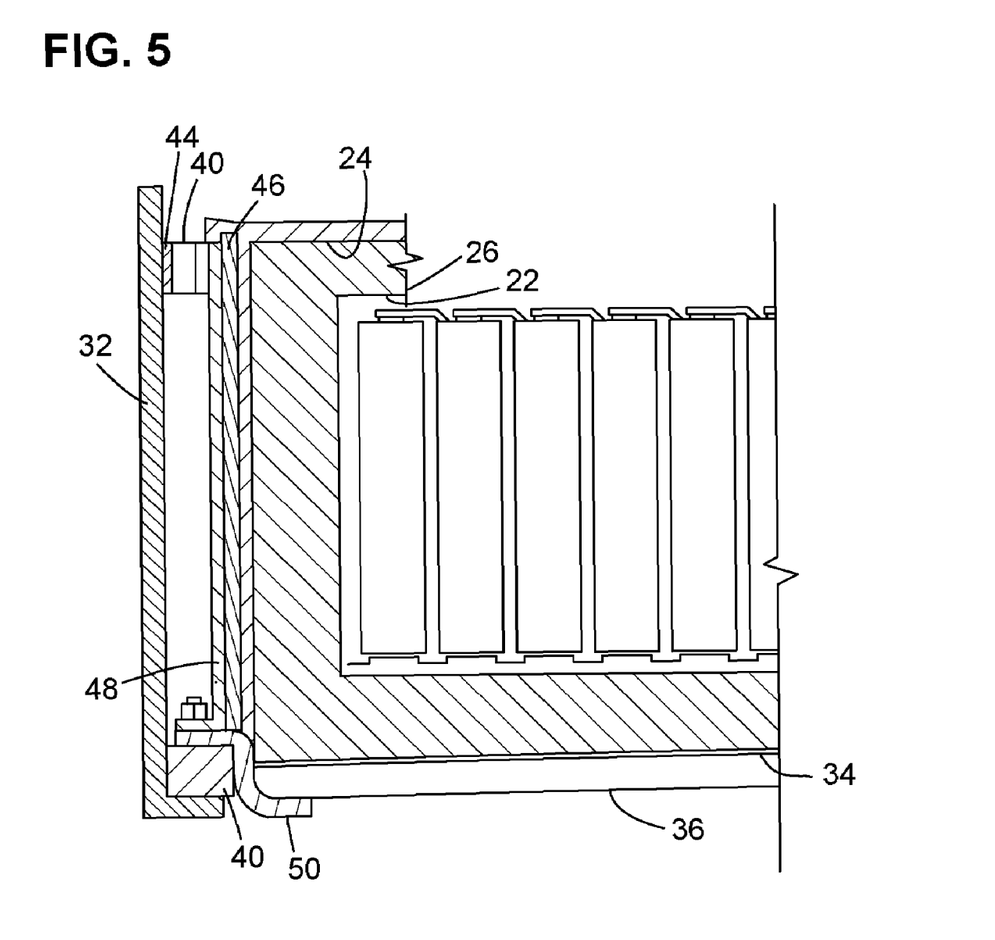
FIG. 5 illustrates a cross-sectional view of the battery case of FIG. 3 without a battery.
Figure 6:
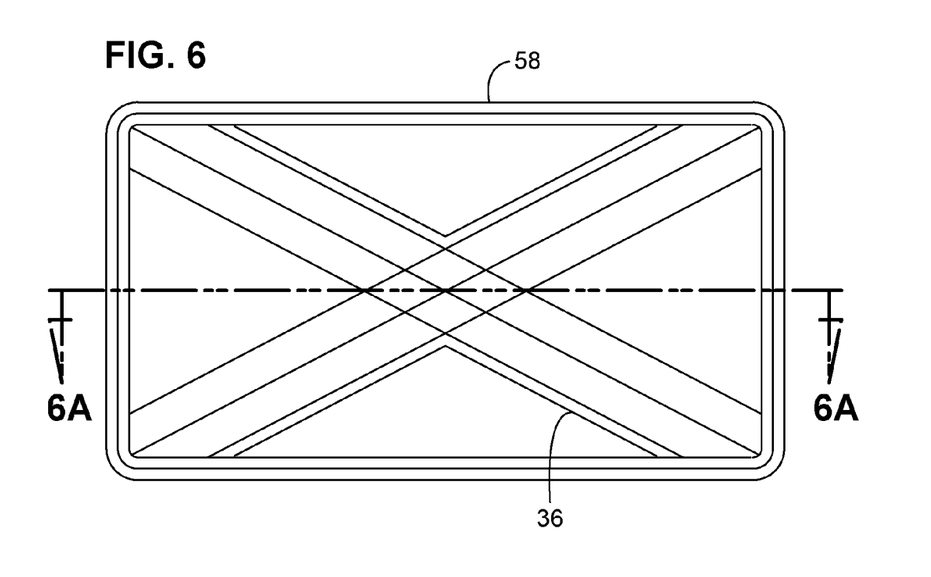
FIG. 6 illustrates a bottom view of the battery case of FIG. 3
Figure 6A:
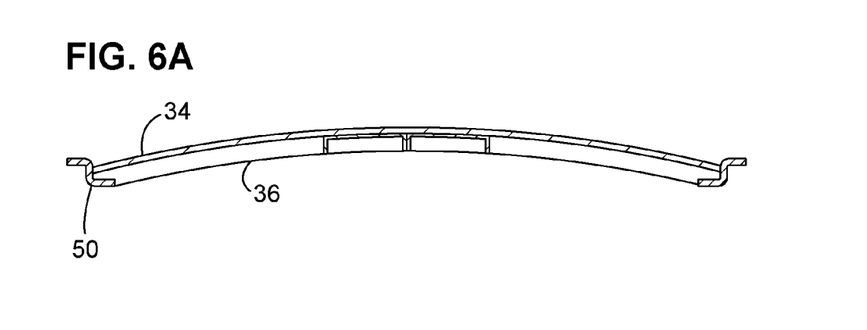
FIG. 6A is a cross-sectional view along the line 6A-6A of FIG. 6.

Structural features of the various components of the battery enclosure 30 are selected so as to provide a desired frequency response of the enclosure/battery combination. For example, a flat bottom sheet may have a low natural frequency, for example, 10 Hz, which may be a frequency in which a significant amount of energy is found in the frequency spectrum of the vehicle containing the battery 11. FIGS. 5 and 6 illustrate cross-sectional and bottom views, respectively, of the battery enclosure 30. As shown, in this embodiment, the bottom sheet 34 is disposed on top of a pair of C-channel struts 36 laced into each other in an X-pattern, making the resulting assembly lightweight and stiff. Filler strips 58 are disposed around the rest of the perimeter of the bottom sheet assembly as shown in FIG. 6. At the corners, the C-shaped struts 36 are notched out so as to accommodate an S-shape member 58 to fill the notched out gap all around, forming a smooth transition from the S-shaped member 58 and the C-shaped struts 36. As such, the shape of the struts 36, the disposition, and/or mounting of the same on the bottom sheet 34 are selected so as to alter the frequency response of the battery enclosure 30. For example, in the embodiment illustrated in FIGS. 5 and 6, the struts 36 connected to the bottom sheet 34 as explained increase the natural frequency of the battery enclosure 30, for example, to 200 Hz, avoiding low resonant frequencies from the energy spectrum of the vehicle. In addition, as already explained, the vibration isolators 40 may also be selected by taking into consideration other known resonant frequencies present during the operation of the vehicle. The various disclosed embodiments will facilitate or allow the control of cell translation and to protect against resonant frequencies.

As understood by those of ordinary skill in the arts, one of the advantageous fixtures of the battery enclosure 30 is that it may be configured to eliminate or reduce vibrations induced by forces generated during the operation of the vehicle carrying the battery 11. As a non-limiting example, if the vehicle is a locomotive, the battery enclosure 30 may be exposed to large forces generated when coupling the locomotive to other railcars as well as other random vibrations profiles from within the locomotive as well as the interaction of the locomotive with the tracks.

As those of ordinary skill will appreciate, the various embodiments of the disclosed battery enclosures 30 provide for support/handling of the battery 11 as well as structural functionality. The battery enclosure 30 is a stiff case that surrounds the battery 11 on all sides to provide structural integrity and protection in a physically abusive environment that includes high vibration, adverse weather conditions, and the potential for impact from foreign objects. Additionally, the enclosure also allows the battery 11 to be handled with a fork truck, crane, and/or other lifting/maneuvering devices, which may or may not include a fixture for attachment to the battery case or enclosure 30. The battery enclosure 30 may also provide a mounting and/or positioning interface to other intended battery systems related to, for example, the vehicle and power plant of the vehicle, to name a few.

Figure 7:
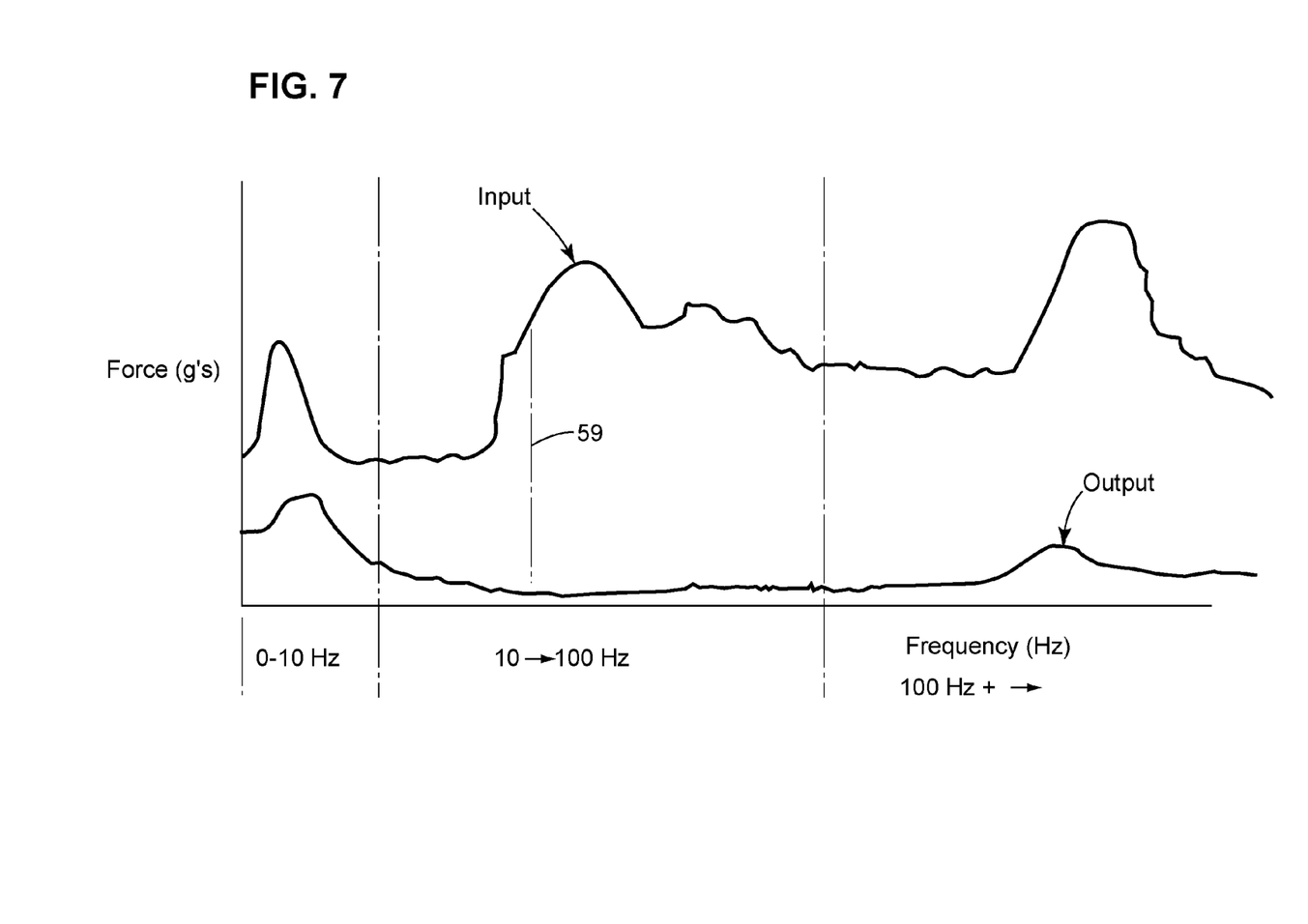
FIG. 7 illustrates a qualitative representation of a battery enclosure input and output response according to an embodiment of the present invention.

A qualitative representation of an input/output frequency response of the battery enclosure 30 is illustrated in FIG. 7. As shown, the frequency response is generally divided in three general qualitative regions: a low-frequency region for frequencies below 10 Hz; an intermediate-region for frequencies between 10 and 100 Hz; and a high-frequency region for frequencies above 100 Hz. The vertical line 59 represents the natural frequency of the battery enclosure 30. As understood by those of ordinary skill in the applicable arts, the curves shown in FIG. 7 are a general qualitative representation of the frequency response of the battery enclosure 30. For frequencies below the natural frequency of the battery enclosure 30, the output through the vibration isolation system has a low-frequency response that does not align itself with the input frequencies, thus avoiding the excitation of the battery enclosure 30 at frequencies that would naturally be with portions of the input with significant energy content. In addition, for frequencies above the natural frequency of the battery enclosure 30 (frequencies above the vertical line 59), the isolation system substantially attenuates all inputs.

Figure 8A:
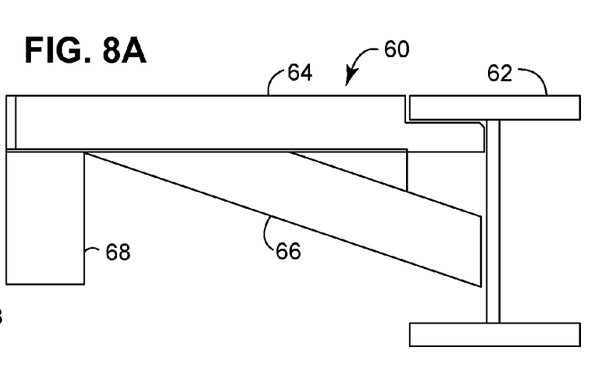
Figure 8B:
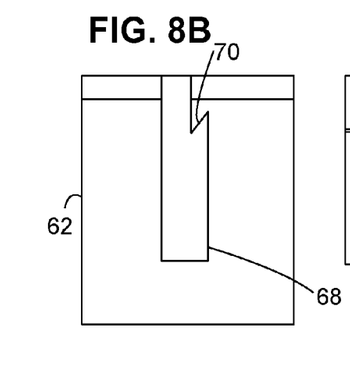
Figure 8C:
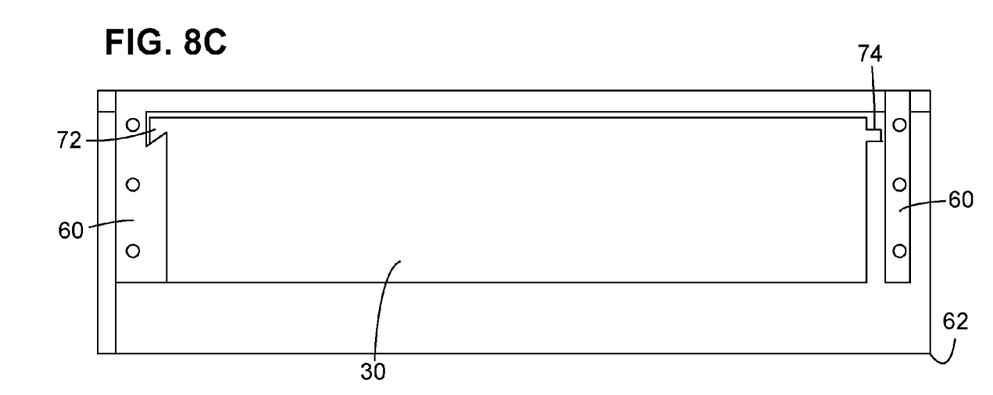

As previously mentioned, the batteries 11 are typically heavy, weighing many hundreds of pounds or even over thousand pounds, and can only be handled by cranes and fork lift trucks. As such, one of the advantageous features of the subject matter disclosed include ways to facilitate the handling of the batteries 11 and the locating of these batteries with relative ease. The battery enclosure 30 may be attached to the vehicle carrying the same in any manner known in the art. Nevertheless, in order to facilitate installation and removal as well as connection with high-voltage vehicle wiring, improved brackets may be used to suspend the battery enclosure 30 containing the battery 11 therein from a structural member of the vehicle. In view of their weight, attachment to a structural member of the vehicle would be preferred, although the embodiments of the disclosed inventions are not limited by the disposition of the battery within the vehicle. FIG. 8 illustrates several views of an embodiment of a rack-mounting bracket 60 configured to provide for easy positioning of heavy electric batteries in electrical or hybrid vehicles. FIG. 8 includes side (FIG. 8A) and front (FIG. 8B) views of the rack-mounting bracket 60 as well as a front view (FIG. 8C) of the battery enclosure 30 with battery 11 supported by two rack-mounting brackets 60.

As shown in FIG. 8A, the rack-mounting bracket 60 is connected to a structural member 62 of the electric or hybrid vehicle (not shown) and includes a plurality of frame members 64, 66, and 68. For example, generally in a locomotive, structural members are long are long and can support multiple enclosures and can easily be reached with forklift trucks. The disclosed battery enclosure 30 and rack-mounting brackets 60 may be used in new electric and or hybrid vehicle or existing vehicles that have be retrofitted as an electric or hybrid vehicle, but are particularly useful for use in retrofitted electric or hybrid vehicles, as listed hereinabove, so as to facilitate mounting and transporting the needed batteries. As shown in FIG. 8B, the rack-mounting bracket 60 also includes a notch or groove 70. In use, as shown in FIG. 8C, complementary protrusions 72, 74 of the battery enclosure 30 are mated with the notch or grooves 70 of the rack-mounting device 60 so as to allow the battery enclosure 30 with the battery 11 to be easily inserted and/or removed from the electrical or hybrid vehicle. As used herein, the expression "notch or groove" encompasses not only the illustrated embodiments, but also a V-shaped indentation, a slit, a rounded indentation, and/or a long narrow channel or depression to accommodate complementary shapes of the protrusions 72, 74. As can be seen from FIG. 8C, the protrusions 72, 74 provide support and some maneuverability and tolerance while installing and/or servicing/removing the battery case/enclosure 30.

As further illustrated in FIG. 8, the first frame member 64 is connected to the structural member 62 at a first end portion and extends generally horizontally therefrom. An end portion of the second frame member 66 is connected to the first frame member 64 at the second end portion of that member away from the structural member 62, while a second end portion of the second frame member 66 extends diagonally and rests against or is welded to the structural member 62. The third member 68 of the rack-mounting bracket 60 is also connected to the second end portion of the first member 64 and extends generally downward therefrom. The three frame members 62, 64, and 66 of the rack-mounting bracket 60 form a two-force structural support in which the diagonal inclination of the second member 64 may be selected so as to improve the structural integrity of the rack-mounting bracket 60. Generally speaking, a two-force support applies very little or no torque, so the forces involved are mainly compression and/or elongation/tension types of forces.

In use, the notch or groove 70 of the first member 64 together with the second member 66 supports the combined weight of the battery enclosure 30 and the battery 11 from the structural member 62. The third member 68 provides (1) guidance and alignment for the battery enclosure 30 during insertion or removal of the battery 11 into and from the electrical or hybrid vehicle and also (2) a fastened interface to the battery enclosure 30 after insertion so as to prevent dislodgment during operation. As will be apparent to those of ordinary skill, in some instances, the notch or groove 70 may be provided in the third member 68 instead of in the first member 64. In such embodiments, either the rack-mounting bracket 60 or the structural member 62 will have an additional notch or groove to support the rear portion of the battery enclosure 30 while the front portion is supported by the notch or groove 70 located in the third member 68. Thus, while a notch or groove 70 disposed on the third member 68 is contemplated by embodiments of the present invention, disposition of the notch or groove 70 on the first member 64 is favored.

Figures 9, 10:
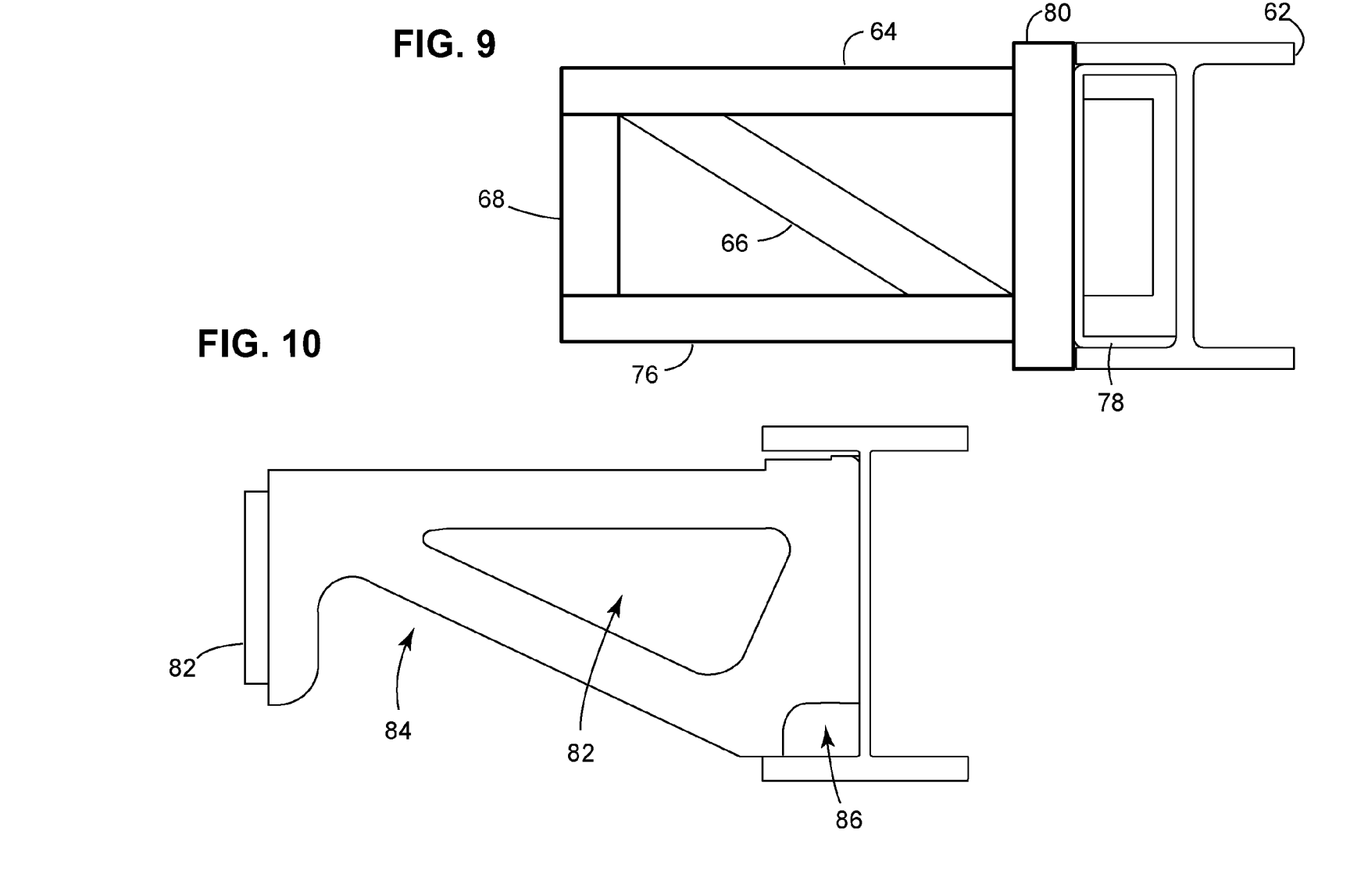
FIG. 9 illustrates another embodiment of a rack-mounting bracket.
FIG. 10 illustrates yet another embodiment of a rack-mounting bracket.

Alternative embodiments of the rack-mounting bracket 60 of FIG. 8 are shown in FIGS. 9 and 10. In the embodiment of FIG. 9, an additional horizontally extending fourth member 76 is provided and the inclination of the second member 66 is increased so that both the first and fourth members 64 and 76 are connected thereby, thus allowing two battery enclosures 30 to be stacked on top of each other from respective notch or grooves 70 in the first and fourth members 64 and 76. In addition, the connection of the rack-mounting bracket 60 of FIG. 9 to the structural member 62 is accomplished by use of a C-channel support 78 connected to the rear portion of a vertically extending member 80 connected to end portions of the first and fourth members 64 and 76, as illustrated. As those of ordinary skill will appreciate, the space created between the C-channel support 78 and the structural member 62 of the vehicle may be used to accommodate wires and other elements connected to the battery 11, including tubes, pipes, or the like to carry air or other fluids for cooling.

Both bracket embodiments of FIGS. 8 and 9 are made of individual elements, such as tubes of any cross-sectional shape, connected to each other, for example, by welding. In the embodiment of FIG. 10, the rack-mounting bracket 60 is made of a single sheet of metal cut to any desired shape to insure structural integrity while, at the same time, reducing the overall weight of the rack-mounting bracket 60 and expediting the bracket manufacturing process. As illustrated, the rack-mounting bracket 60 of FIG. 10 has been manufactured by cutting three portions 82, 84, and 86 from a solid metal sheet. Removal of portions 82 and 84 provide for the overall shape of the rack-mounting bracket 60, including portions corresponding to the first, second, and third members 64, 66, and 68, while removal of the third portion 86 provides a cutout for wiring and other connections, as already explained. The rack-mounting bracket 60 of FIG. 9 may be laser-cut. A fastened interface 82 to hold the battery enclosure 30 in place after insertion may be connected, for example, by welding, at the end portion of the rack-mounting bracket 60 distal from the structural member 62.

Methods for securing a battery to a battery enclosure are also within the embodiments of the inventions disclosed.

These methods include covering at least a portion of the battery with a composite sheet, disposing a strap over the composite sheet, attaching end portions of the strap to a bottom sheet of the battery enclosure, and compressing a bottom surface of the battery to a pre-stressed convex surface of the bottom sheet of the battery enclosure so that internal cells of the battery are maintained substantially flat. These methods further include isolating the battery from vibrations from a vehicle carrying the battery by disposing elastomeric vibration isolators between sidewalls of the enclosure and the bottom sheet. In addition, these methods also include selecting a physical property of the elastomeric vibration isolators selected from the group consisting of a spring constant, a dynamic response, and combinations thereof based on a natural frequency of the battery enclosure, on a natural frequency of the battery, on a frequency spectrum of vibrations transmitted from a vehicle carrying the battery enclosure and the battery, or on combinations thereof.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. A battery enclosure, comprising:
   a pre-stressed bottom sheet having a convex top surface;
   at least one vibration isolator disposed along at least a portion of a perimeter of the bottom sheet;
   a sidewall having a bottom portion in contact with the vibration isolator, the sidewall being isolated from the bottom sheet by the vibration isolator; and
   at least one strap having two end portions, each end portion being attached to the bottom sheet, the at least one strap being configured to hold a bottom surface of an outer casing of a battery against the top surface of the bottom sheet.

2. The battery enclosure according to claim 1, wherein the at least one vibration isolator comprises four vibration isolators disposed on each corner of the bottom sheet and the at least one strap comprises four straps, the battery enclosure further comprising:
   composite sheets, the composite sheets being disposed between the four straps and external surfaces of the battery; and
   a plurality of vibration isolators disposed between the composite sheets and the sidewall.

3. The battery enclosure according to claim 1, wherein the sidewall is L-shaped and the at least one vibration isolator is disposed on an inside corner of the L-shaped sidewall.

4. The battery enclosure according to claim 1, further comprising:
   struts connected to a bottom surface of the bottom sheet.

5. The battery enclosure according to claim 4, wherein the sidewall is L-shaped, a cross section of the struts is C-shaped, the struts are disposed on the bottom surface of the bottom sheet on an X pattern, the bottom sheet includes an S-shaped member disposed along the perimeter of the bottom sheet, the at least one vibration insulator is disposed between the S-shaped member and an inside corner of the L-shaped sidewall, and an end portion of the S-shaped member is substantially flush with a bottom portion of the C-shaped struts.

6. The battery enclosure according to claim 1, further comprising:
   an L-shaped cover, a first portion thereof forming a portion of the sidewall, a second portion of the L-shaped cover, perpendicular to the first, being configured to cover the battery enclosure, and the second portion of the top cover being configured to slide in and out of the battery enclosure on tracks disposed on a top portion of the sidewall.

7. The battery enclosure according to claim 1, further comprising:
   a plurality of brackets attached to the bottom sheet to support external components of the battery.

8. The battery enclosure according to claim 1, wherein the at least one vibration isolator is an elastomeric material.

9. The battery enclosure according to claim 8, wherein physical properties of the elastomeric material selected from the group consisting of a spring constant, a dynamic response, and combinations thereof are selected based on a natural frequency of the battery enclosure, on a natural frequency of the battery, on a frequency spectrum of vibrations transmitted from a vehicle carrying the battery enclosure and the battery, or on combinations thereof.

10. A combination, comprising:
    a battery including a plurality of cells interconnected by a plurality of bus bars, a button sheet supporting the plurality of cells, and an outer casing surrounding the button sheet and the plurality of cells; and
    a battery enclosure including a pre-stressed bottom sheet having a convex top surface, at least four vibration isolators disposed on corresponding corners of the bottom sheet, sidewalls isolated from the bottom sheet by the at least four vibration isolators, four straps each having two end portions attached to the bottom sheet, a plurality of composite sheets, a plurality of vibrator isolators, and an L-shaped cover,
    wherein a first portion of the L-shaped cover forms a portion of the sidewalls, a second portion of the L-shaped cover, perpendicular to the first, is configured to cover the battery enclosure, the second portion of the top cover is configured to slide in and out of the battery enclosure on tracks disposed on a top portion of the sidewalls, the plurality of insulators are disposed on the composite sheets, the sidewalls are separated from the composite sheets by the plurality of vibrator insulators, an outer surface of the outer casing of the battery is compressed against the top surface of the bottom sheet by the straps such that the plurality of cells of the battery is substantially flat, and the composite sheets are disposed between the straps and the battery.

11. The combination according to claim 10, wherein the bottom sheet includes struts disposed on a bottom surface thereof, the sidewalls are L-shaped, a cross section of the struts is C-shaped, the struts are disposed on the bottom surface of the bottom sheet on an X pattern, and the bottom sheet includes an S-shaped member disposed along the perimeter of the bottom sheet, the at least four vibration insulators being disposed between the S-shaped member and an inside corner of the L-shaped sidewalls and an end portion of the S-shaped member being substantially flush with a bottom portion of the C-shaped struts.

12. The combination according to claim 10, wherein the at least four vibration isolators are made of an elastomeric material, wherein physical properties of the elastomeric material selected from the group consisting of a spring constant, a dynamic response, and combinations thereof are selected based on a natural frequency of the battery enclosure, on a natural frequency of the battery, on a frequency spectrum of vibrations transmitted from a vehicle carrying the battery enclosure and the battery, or on combinations thereof.

13. The combination according to claim 10, further comprising a vehicle, the battery enclosure with the battery therein being disposed in the vehicle.

14. The combination according to claim 13, the battery enclosure further comprising at least one protrusion to mate with a corresponding groove on at least one rack-mounting bracket connected to a structural member of the vehicle, the at least one rack-mounting bracket, comprising:
   a first frame member having a first portion connected to a structural member of the vehicle, the first member extending generally horizontally from the structural member;
   a second frame member having a first end portion connected to the first frame member at a second end portion of the first member disposed away from the structural member and a second end portion, extending diagonally, connected to the structural member; and
   a third frame member connected to the second end portion of the first member extending generally downward therefrom.

15. The combination according to claim 14, wherein the at least one rack-mounting bracket further comprises a fourth frame member extending substantially parallel to the first member, and a C-channel support connected to the first and fourth frame member, wherein the C-channel support is connected to the structural member so as to form a passage for battery wiring and cooling, and the at least one rack-mounting bracket is configured to hold two battery enclosures one on top of the other.

16. The combination according to claim 14, wherein the at least one rack-mounting bracket is made of a single laser-cut metal sheet and the at least one rack-mounting rack includes a cutout to form a passage for battery wiring and cooling.

17. The combination according to claim 13, wherein the vehicle is selected from the group consisting of a locomotive, an off-highway mining vehicle, a marine vehicle, a crane, a bus, and an automobile.

18. The combination according to claim 17, wherein the vehicle is a retrofitted vehicle.

19. A method for securing a battery to a battery enclosure, the method comprising:
   covering at least a portion of the battery with a composite sheet;
   disposing a strap over the composite sheet;
   attaching end portions of the strap to a bottom sheet of the battery enclosure; and
   compressing a bottom surface of the battery to a pre-stressed convex surface of the bottom sheet of the battery enclosure so that internal cells of the battery are maintained substantially flat.

20. The method according to claim 19, further comprising:
   isolating the battery from vibrations from a vehicle carrying the battery by disposing elastomeric vibration isolators between sidewalls of the enclosure and the bottom sheet.

21. The method according to claim 19, further comprising:
   selecting a physical property of the elastomeric vibration isolators selected from the group consisting of a spring constant, a dynamic response, and combinations thereof based on a natural frequency of the battery enclosure, on a natural frequency of the battery, on a frequency spectrum of vibrations transmitted from a vehicle carrying the battery enclosure and the battery, or on combinations thereof.

* * * * *